Dec. 17, 1946.    R. C. BASCOM    2,412,796
WINDOW CHANNEL
Filed Oct. 14, 1943    2 Sheets-Sheet 1

INVENTOR.
ROGER C. BASCOM
BY Hyde and Meyer
ATTORNEYS

Dec. 17, 1946.   R. C. BASCOM   2,412,796
WINDOW CHANNEL
Filed Oct. 14, 1943   2 Sheets-Sheet 2

INVENTOR.
ROGER C. BASCOM
BY Hyde and Meyer
ATTORNEYS.

Patented Dec. 17, 1946

2,412,796

UNITED STATES PATENT OFFICE 2,412,796

WINDOW CHANNEL

Roger C. Bascom, Port Clinton, Ohio, assignor to The Standard Products Company, Detroit, Mich., a corporation of Ohio Application October 14, 1943, Serial No. 506,225

9 Claims. (Cl. 296—44.5)

This invention relates to runways or guides, such as are used in automobile bodies and the like for the guidance and/or support of window panes. More particularly, the present invention relates to that type of window runway or guide which is of generally channel-shaped cross section and which is adapted to be longitudinally bent to conform to the contour of the window frame in which it is mounted in use thereof.

The invention has for its primary object the provision of a window runway or guide which is of simple and inexpensive construction, so that it can be made and sold at low cost; which has sufficient flexibility to enable it to be longitudinally bent and thereby conform to the contour of the window frame in which it is used; and which has sufficient rigidity for effective lateral support of the window pane received thereby, the degree of rigidity, particularly of the side walls, being such as to enable the runway or guide to withstand any distorting or crushing influences to which it may be subjected during its manufacture, installation and use.

A further object of the present invention is the provision of a window runway or guide having a suitably covered sheet metal core of generally channel-shaped cross section provided with transversely disposed, longitudinally spaced ribs or corrugations which materially increase its resistance to distortion, and which core is so slotted as to enable it to be longitudinally bent, and thereby conform to the contour of a window frame, without materially reducing the strengthening or reenforcing effect of said ribs or corrugations.

A further object of the present invention is the provision of a window runway or guide in which the channel-shaped core thereof is provided in each of its side walls with longitudinally spaced slots extending transversely from points adjacent the core base through the free longitudinal edge of such side wall.

This enables the core side wall portions, on opposite sides of each of said slots, to be brought into overlapping relation as the runway or guide is longitudinally bent. As a result, there is a reduction in the bending or deflection at the core base, on the outside of the curve, and hence, a corresponding reduction in the extent to which the core covering, along the core base, must elongate as the runway or guide is longitudinally bent. This makes possible the use of ordinary woven fabric or the like as the core covering, with consequent reduction in the cost of such covering.

A further object of the present invention is the provision of a window runway or guide having a channel-shaped core transversely ribbed or corrugated for increased strength and rigidity, and which core is provided in the end portions of the ribs or corrugations, in the core side walls, with slots which enable the core to be longitudinally bent. Preferably, the slots in one core side wall are located in the front walls of the core ribs or corrugations and the slots in the other core side wall are located in the rear walls of the core ribs or corrugations. As a result, the provision of such slots does not materially reduce the re-enforcement of the core provided by the ribs or corrugations thereof.

A further object of the present invention is the provision of a window runway or guide having a channel-shaped, transversely ribbed or corrugated core containing alternately arranged base and side wall slots located in said ribs or corrugations, the base slots, in alternate ribs or corrugations, extending across the base and into the core side walls, and the side wall slots being alternately located in the front and rear walls of the intervening ribs or corrugations. As the result of the provision of these two sets of slots, the longitudinal bending of the runway or guide not only brings about an overlapping relationship, at the bend, of the core side wall portions adjacent the side wall slots but also, relative divergence, at the bend, of the core base portions adjacent the core base slots. This effects an even greater reduction in the bending or deflection of the core base, at the outside of the curve, with a corresponding reduction in the extent to which the core covering, along the core base, must elongate as the core is longitudinally bent, all as will hereinafter more fully appear.

Further objects of the present invention, and many of its practical advantages, will be referred to in, or will be evident from, the following description of two embodiments of such invention, as illustrated in the accompanying drawings, in which Fig. 1 is a perspective view of a window runway or guide embodying the present invention, the core covering of said runway or guide, for a part of its length, being broken away to show the underlying core;

Figure 1:
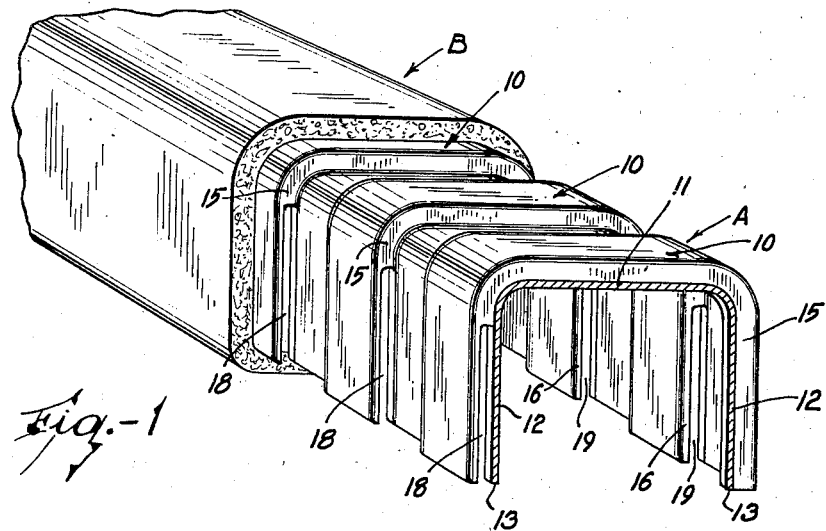

Before proceeding to specifically describe the two window runways or guides here illustrated, for the disclosure of those features which characterize the present invention it should be understood that the invention is not limited to the structural details or arrangements here chosen for illustration, as the invention obviously may take other forms. It also is to be understood that the phraseology or terminology herein employed is for the purpose of description and not of limitation, the scope of the present invention being denoted by the appended claims. Moreover, for clarity and simplicity of disclosure, the thickness of the metal of the cores of the runways or guides, and the thickness of the fabric of the core coverings, have been more or less exaggerated.

Generally speaking, a window runway or guide of the type here involved desirably should have three attributes, namely, (1) such strength or local reenforcement as to enable it to withstand distorting or crushing influences during manufacture, installation and use; (2) such lengthwise flexibility as to enable it to be longitudinally bent to thereby conform to the contour of the window frame in which it is mounted in use thereof; and (3) such a limitation in the extent to which the core covering must elongate, along the core base, as the runway or guide is longitudinally bent, as to enable ordinary woven fabric and the like to be used for the core covering. As will hereinafter appear, runways or guides embodying the present invention possess all three of these attributes.

For purposes of strength and rigidity a window runway or guide embodying the present invention has a sheet metal core re-enforced by transverse ribs or corrugations. This materially increases the amount of metal per unit of length, and the additional metal, especially when distributed as transverse ribs or corrugations of full core width, affords considerable strength and re-enforcement to the base and side walls of the core. The core, and thus the runway or guide as a whole, are thus enabled to offer increased resistance to any distorting or crushing influences to which the runway or guide may be subjected during its manufacture, installation or use. Moreover, the side walls of the runway or guide are able to provide effective lateral support for the window pane received thereby.

To enable the runway or guide to be longitudinally bent to conform it to the contour of a window frame, notwithstanding the stiffening or rigidifying effect of the transverse ribs or corrugations, and to so limit the extent to which the core covering must elongate, along the core base, as the runway or guide is longitudinally bent, that ordinary woven fabric or the like may be used for the core covering, said core is provided with transversely extending slots. As will hereinafter appear, these slots are of such character and so located that they not only bring about the two objectives just mentioned but also, they enable such objectives to be accomplished without materially reducing the strengthening or stiffening effect afforded by the ribs or corrugations.

In Figs. 1 to 5 inclusive is illustrated one form of runway or guide embodying the present invention, said runway or guide comprising a sheet metal core A of generally channel-shaped cross section, and a suitable covering B therefor which may be, and here is, made of ordinary woven fabric, as distinguished from knitted, bias-cut and other special fabrics. As shown, the core is provided throughout its length with transversely disposed, longitudinally spaced and outwardly extending ribs or corrugations 10, each extending across the core base 11 and across each of its side walls 12 to the free longitudinal edge 13 thereof. Preferably and as here shown, each of these ribs or corrugations is of more or less channel shape in cross section, with generally parallel side walls and a rather broad connecting wall. For convenience of description, the side walls 15 of the ribs or corrugations which are toward the observer in Fig. 1 are hereinafter termed the front walls thereof, the other side walls 16 of the ribs or corrugations being hereinafter termed the rear walls thereof. In actual practice, these ribs or corrugations may be of the order of ⅛ of an inch in width and $\frac{1}{16}$ of an inch (or less) in depth, although obviously the size, as well as the shape, of the ribs or corrugations may be varied, as desired. Preferably, they are produced while the core is in its flat form, as by passing the core strip between corrugating rolls, or by pressure applied to the strip by suitable bending dies.

As heretofore pointed out, the provision of these transverse ribs or corrugations locally strengthens and reenforces the core so that it is effectively enabled to withstand any distorting or crushing influences to which the runway or guide may be subjected in its manufacture, installation or use. It possesses the rigidity required of it, particularly in its two side walls.

The core A also is provided with transversely disposed, longitudinally spaced slots of such character and so located as to enable the runway or guide to be longitudinally bent, without materially reducing the strengthening or reenforcing effect of the ribs or corrugations, and with an appreciable reduction in the extent to which the core covering must elongate, along the core base, as the runway or guide is longitudinally bent.

As shown, these slots are located in the side walls of the core A, preferably in the walls of the core ribs or corrugations 10. They may be simple cuts, made by a slitting blade or the like without removal of metal or, as here shown, they may be in the form of narrow slots made by a punch or the like with removal of metal. As best shown in Fig. 1, each slot extends transversely from a point adjacent but spaced from the core base through the free longitudinal edge 13 of the side wall in which it is located. Preferably and as here shown, these slots are located in opposite walls of the core ribs or corrugations 10, the slots 18 in one core side wall (the left side wall, as viewed in Fig. 1) being in the front side walls 15 of such ribs or corrugations and the slots 19 in the other core side wall being in the rear side walls 16 of such ribs or corrugations. As a result, the provision of such slots, though enabling the core to be readily bent longitudinally, does not materially reduce the strengthening or stiffening effect afforded by the ribs or corrugations.

Figures 2, 3:
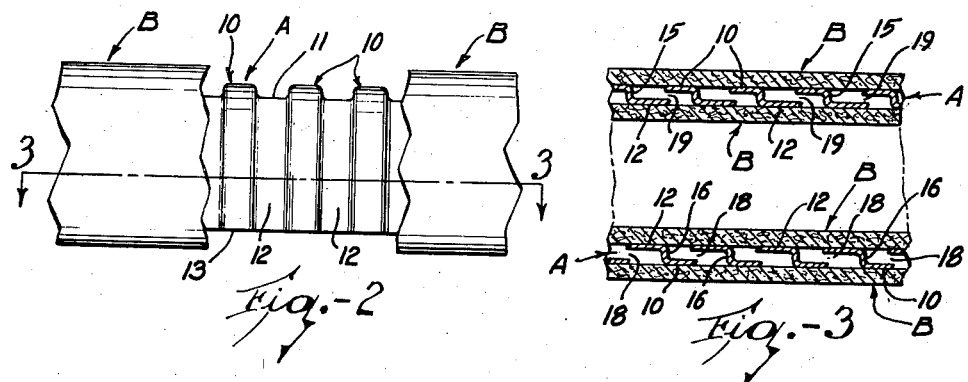
Fig. 2 is a side elevation of said runway or guide, the core covering again being broken away in part.
Fig. 3 is a longitudinal sectional view of said runway or guide, the view being on the line 3—3 of Fig. 2.
Figures 4, 5:
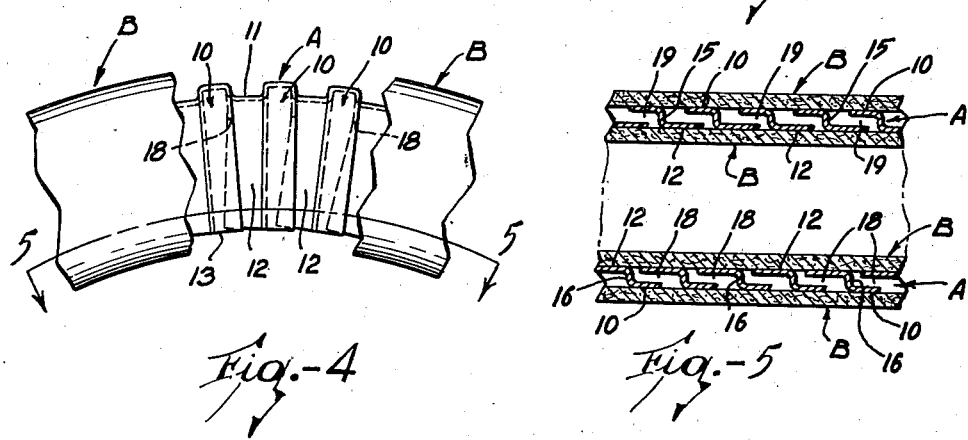
Fig. 4 is a view corresponding to Fig. 2 but showing the runway or guide in longitudinally bent form.
Fig. 5 is a longitudinal sectional view on the line 5—5 of Fig. 4.
Figure 6:
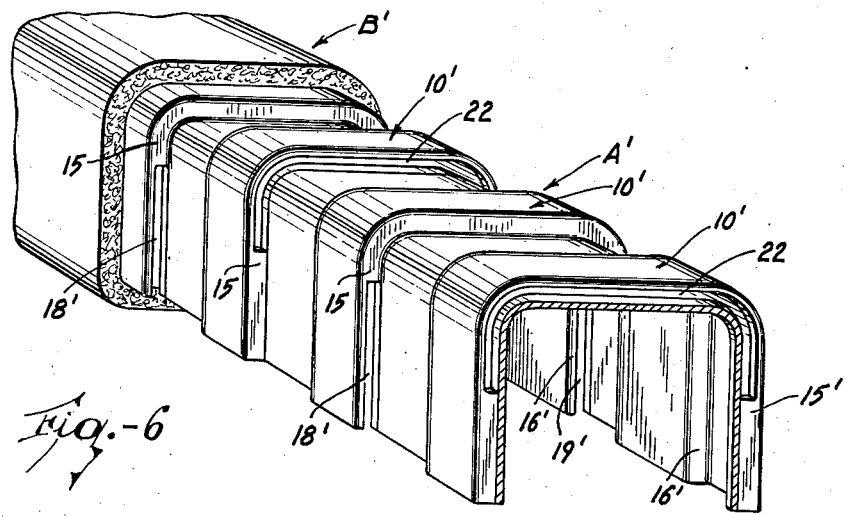
Fig. 6 is a view similar to Fig. 1 but showing a runway or guide having a modified form of core embodying the present invention.
Figure 7:
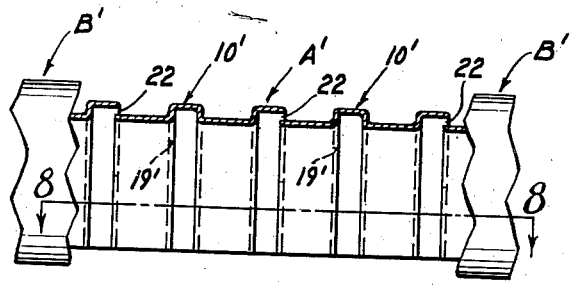
Fig. 7 is a side view, partly in section and partly in elevation, of the runway or guide of Fig. 6.
Figure 8:
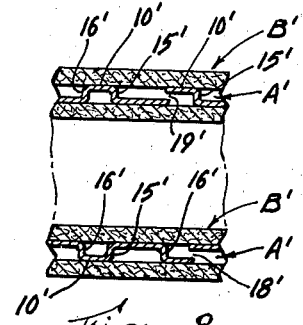
Fig. 8 is a longitudinal sectional view on the line 8—8 of Fig. 7.

When the runway or guide is in straight or longitudinally unbent condition, as in Figs. 1 and 2, the core slots 18 and 19 are in generally parallel relation, as shown in Fig. 1 and as will be readily understood. However, when the runway or guide is longitudinally bent to arcuate form, as in Fig. 4, to conform it to the contour of a window frame, the core side wall slots permit the non-aligned core side wall portions adjacent such slots to be brought into overlapping relationship, as shown in Figs. 4 and 5. This reduces the bending or deflection occurring in the base of the core, on the outside of the curve, and thus makes possible the use, for the core covering B, of material having less elongation than knitted, bias-cut or other special fabrics. With a core of this character, therefore, the core covering can be made of ordinary woven fabric, which materially reduces the cost of the core covering and hence the cost of the runway or guide as a whole.

Preferably and as here shown, the core A is completely encircled by the covering B which may be adhesively or otherwise suitably secured thereto, as is usual. The meeting or adjacent longitudinal edges of the core covering may be located either interiorly or exteriorly of the core, and are here located interiorly thereof, along the core base.

Referring now to that form of the invention illustrated in Figs. 6 to 10 inclusive, it will be noted that the runway or guide there shown differs from the one just described as to its core slots and as to the spacing of the core ribs or corrugations. In this second embodiment of the invention, the sheet metal core A' not only is provided in each of its side walls with transverse slots 18' and 19', corresponding respectively to the slots 18 and 19 of the core A of Figs. 1 to 5 inclusive but also, with an additional series of slots 22, hereinafter termed base slots, and extending across the core base and into each of the side walls thereof. As before, the side wall slots 18' and 19' are located in the front and rear walls of the core ribs or corrugations, the slots 18' in the left side wall of the core, as viewed in Fig. 6, being located in the front walls 15' of the transverse ribs or corrugations 10' and the slots 19' in the other side wall of the core being located in the rear walls 16' of such ribs or corrugations. However, in this embodiment of the invention, the side wall slots 18' and 19' are located only in alternate ribs or corrugations, the intervening ribs or corrugations carrying the base slots 22 in either the front or rear walls thereof—the front walls, as here shown.

Figure 9:
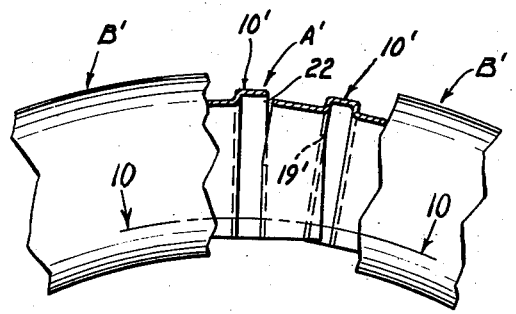
Fig. 9 is a view similar to Fig. 7 but showing the runway or guide in longitudinally bent form.
Figure 10:
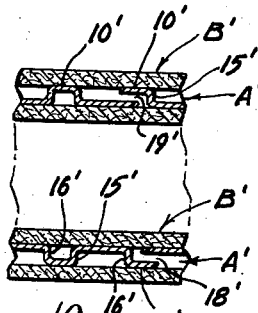
Fig. 10 is a longitudinal sectional view on the line 10—10 of Fig. 9.

When a runway or guide with such a core is longitudinally bent, as in Fig. 9, to conform it to the contour of a window frame, there not only is an overlapping of the non-aligned core side wall portions adjacent the side wall slots 18' and 19' (as described in connection with the core of the runway or guide of Figs. 1 to 5 inclusive) but also, relative divergence of the core base portions adjacent the core base slots 22.

With the core of this second form of the invention, therefore, there is a further reduction in the bending or deflection occurring at the base of the core, at outside of the curve, and hence a further reduction in the extent to which the core covering B' must elongate, at the core base, as the runway or guide is longitudinally bent. For the covering B' for this core, ordinary woven fabric also may be employed, the use of knitted, bias-cut or other special fabrics being unnecessary. Although the ribs or corrugations 10' of core A' are shown as spaced somewhat farther apart than the corresponding corrugations 10 of core A, it is to be understood that any desired spacing of the ribs or corrugations of either core may be employed.

From the foregoing description of two embodiments of the present invention, it will be evident that window runways or guides embodying such invention are sufficiently rigid to withstand any distorting or crushing influences to which they may be subjected in their manufacture, shipment, installation or use; that the core slots enable the runways or guides to be longitudinally bent and thereby conform to the contour of the window frames in which they are used, without materially reducing the strengthening or reenforcing effect provided by the transverse core ribs or corrugations; and that the core slots so reduce the bending or deflection occurring at the bases of the runways or guides (the outside of the curves) that ordinary woven fabric is satisfactory for the core coverings. The use of special fabrics having relatively high elongation characteristics, such as knitted and bias-cut fabrics, are therefore unnecessary for the core coverings.

To those skilled in the art to which the present invention relates, other features and advantages of window runways or guides embodying the present invention will be evident.

What I claim is:

1. A sheet metal core for a window runway or guide, said core comprising a base and a pair of side walls, the side walls of said core being reenforced by transverse longitudinally spaced ribs or corrugations and being provided in the side walls of said ribs or corrugations with slots extending transversely of the core and through the free longitudinal edges of the core side walls, said slots enabling the core side wall portions adjacent such slots to be brought into overlapping relationship at the bend when the core is longitudinally bent in conforming it to the contour of a window frame.

2. A sheet metal core for a window runway or guide, said core comprising a base and a pair of side walls, the side walls of said core being reenforced by transverse longitudinally spaced ribs or corrugations and being provided with slots alternately located in the side walls of said ribs or corrugations and extending transversely of the core and through the free longitudinal edges of the core side walls, said slots enabling the core side wall portions adjacent such slots to be brought into overlapping relationship at the bend when the core is longitudinally bent in conforming it to the contour of a window frame.

3. A sheet metal core for a window runway or guide, said core comprising a base and a pair of side walls, the side walls of said core being reenforced by transverse longitudinally spaced ribs or corrugations and being provided with slots extending transversely of the core and through the free longitudinal edges of the core side walls, the slots in one core side wall being located in the front side walls of said ribs or corrugations thereof and the slots in the other core side wall being located in the rear side walls of the ribs or corrugations thereof, said slots enabling the core side wall portions adjacent such slots to be brought into overlapping relationship at the bend when the core is longitudinally bent in conforming it to the contour of a window frame.

4. A sheet metal core for a window runway or guide, said core comprising a base and a pair of side walls, the base and the side walls of said core being re-enforced by transverse longitudinally spaced ribs or corrugations and the core side walls being provided with slots extending transversely of the core and through the free longitudinal edges of the core side walls, said slots enabling the core side wall portions adjacent such slots to be brought into overlapping relationship at the bend when the core is longitudinally bent in conforming it to the contour of a window frame, and said core being further provided with longitudinally spaced slots extending across the core base and into the core side walls, said first mentioned slots being located in the side walls of alternate ribs or corrugations and the second mentioned slots being located in the side walls of the other or intervening ribs or corrugations.

5. A sheet metal core for a window runway or guide, said core comprising a base and a pair of side walls, the base and the side walls of said core being re-enforced by transverse longitudinally spaced ribs or corrugations, alternate ribs or corrugations being provided in their side walls with slots extending across the core base and into the core side walls, and the side walls of the intervening ribs or corrugations being provided, in each core side wall, with slots extending transversely of the core from points adjacent the core base through the free longitudinal edge of such core side wall.

6. A sheet metal core for a window runway or channel, said core comprising a base and a pair of side walls, said core being re-enforced by longitudinally spaced ribs or corrugations extending across the core base and across the core side walls to the free longitudinal edges thereof, one of the side walls of every other rib or corrugation having a slot extending across the core base and into the core side walls, and the intervening ribs or corrugations being provided, in each core side wall, with slots extending transversely of the core from points adjacent the core base to the free longitudinal edge of such core side wall, the side wall slots in one core side wall being located in the front side walls of said intervening ribs or corrugations and the side wall slots in the other core side wall being located in the rear side walls of said intervening ribs or corrugations.

7. A sheet metal core for a window runway or channel, said core comprising a base and a pair of side walls, said core being re-enforced by longitudinally spaced ribs or corrugations extending across the core base and across the core side walls to the free longitudinal edges thereof, alternate ribs or corrugations being provided in those side walls thereof which are toward one particular end of the core with slots extending across the core base and into the core side walls, and the intervening ribs or corrugations being provided, in each core side wall, with slots extending transversely of the core from points adjacent the core base to the free longitudinal edge of such core side wall, the side wall slots in one core side wall being located in the front side walls of said intervening ribs or corrugations and the side wall slots in the other core side wall being located in the rear side walls of said intervening ribs or corrugations.

8. A sheet metal core for a window runway or guide, said core comprising a base and a pair of side walls, the side walls of said core being re-enforced by transverse longitudinally spaced ribs or corrugations, alternate ribs or corrugations of each core side wall being provided with slots extending through the free longitudinal edge of such wall, whereby when the core is bent longitudinally in conforming it to the contour of a window frame the core side wall portions adjacent such slots are brought into overlapping relationship at the bend, and said core being further provided with longitudinally spaced slots extending across the core base and into those ribs or corrugations which lie between the aforesaid alternate ribs or corrugations of the core side walls, thereby further facilitating the longitudinal bending of the core.

9. A sheet metal core for a window runway or guide, said core comprising a base and a pair of side walls, said core being re-enforced by longitudinally spaced ribs or corrugations extending across the core base and into the core side walls, alternate ribs or corrugations being provided with slots extending across the core base and into the core side walls, the intervening ribs or corrugations being provided in each of the core side walls with slots extending through the free longitudinal edge of such wall, the provision of the ribs or corrugations giving the core considerable lateral rigidity and the provision of the two sets of slots enabling the core to be readily bent longitudinally in conforming it to the contour of a window frame, the core side wall slots being relatively narrow and the core side wall portions adjacent such side wall slots being brought into overlapping relationship, at the bend, when the core is longitudinally bent.

ROGER C. BASCOM.